3,352,746
MANUFACTURE OF CALCIUM SILICATE
INSULATING PRODUCTS
Stanley E. Williams, North Plainfield, Robert B. Dunbar, Martinsville, and John C. Rademaker, Plainfield, N.J., assignors to Johns-Manville Corporation, New York, N.Y., a corporation of New York
No Drawing. Filed May 5, 1964, Ser. No. 365,157
7 Claims. (Cl. 162—153)

ABSTRACT OF THE DISCLOSURE

Reduction of shrinkage of pre-gelled, shaped and autoclaved hydrated calcium silicate bodies by controlling and proportioning of the effective surface area of the diatomaceous earth silica reactant, particularly in products manufactured by precision molding procedures.

---

This invention relates to an improved method of manufacturing hydrated calcium silicate thermal insulating products, and more particularly to an improvement in the method for the manufacture of gelled and molded hydrated calcium silicate thermal insulating products of U.S. Letters Patent No. 2,699,097 to Binkley, and the products of such improved method.

Precision molding or initially shaping pre-reacted or gelled hydrated calcium silicate slurries to the ultimate or final product dimensions, such as set forth in U.S. Letters Patent No. 2,699,097, comprises a highly desirable and economical technique or means in the manufacture of molded hydrated calcium silicate thermal insulations in that, among other benefits, it eliminates trimming of the final product to exact dimensions with the resulting savings in materials, labor and equipment. However, excessive, erratic or uncontrollable shrinkage of the gelled and molded or shaped insulating body throughout subsequent manufacturing stages, and in particular during drying of the cured insulation, can obviate the principal advantage of this otherwise desirable technique or means.

In general, in the manufacture of hydrated calcium silicate insulating products a well hydrated calcium silicate gel is desirable as it results in optimum wet or uncured strengths or handling characteristics in the product. Moreover, hydration, or the degree thereof, is a significant factor in the shrinkage characteristics of such gelled and molded materials whereby variations or fluctuations in hydration effect erratic shrinkage, and extreme or over hydration results in excessive shrinkage with a commensurate diminishment in the benefits of precision molding or shaping. Thus shrinkage can be regulated to a degree and/or reduced by controlling the gel period and/or temperatures. Nevertheless with factory production techniques wherein, for example, economics dictate the preparation and gelling of the aqueous slurries of lime and silica reactants in large volumes which must be held ready and/or maintained throughout the molding of the entire batch in small increments thereof, effective control of the gel period is often impractical as a means of regulating or retarding shrinkage of the product.

It is a primary object of this invention to provide means of controlling and/or reducing the shrinkage of gelled hydrated calcium silicate products and particularly precision molded or shaped hydrated calcium silicate thermal insulating products.

It is also an object of this invention to provide an effective and economical means of controlling and reducing the shrinkage of gelled and precision molded or shaped hydrated calcium silicate products or insulations which is convenient and effective when utilized with common factory production conditions and techniques, and does not require unduly close regulation of the process conditions.

It has been found that the shrinkage of hydrated calcium silicate gels can be effectively regulated by controlling the surface area of the porous, cellular diatomaceous earth silica reactant. Specifically, shrinkage of the gelled hydrated calcium silicate materials is reduced or retarded by employing or applying the diatomaceous earth silica reactant, or at least an effective amount thereof, in a ratio of fine diatomaceous earth having a surface area averaging about 7.0, or higher, square meters per gram and coarse diatomaceous earth having a surface area averaging about 4.5 to 6.0 square meters per gram and with the proportions of each class of the given fine and coarse diatomaceous earth comprising from approximately 4 parts by weight of the said fine classification of diatomaceous earth to approximately 3 parts by weight of the said coarse classification of diatomaceous earth, ranging up to 0 parts by weight of the said fine classification of diatomaceous earth to 1 part by weight of the said coarse classification of diatomaceous earth, i.e., a ratio, in parts by weight, of fine to coarse particles of from 4/3 through to a ratio of 0/1.

Preferably, the surface area of the respective fine and coarse grades or classifications of diatomaceous earth silica reactant, as determined by a Blaine air permeability apparatus and test method, should consist of a fine fraction averaging about 6.5 to 10.0 square meters per gram and a coarse fraction averaging about 4.5 to 6.0 square meters per gram, and preferably averaging about 7.0 to 8.0 square meters per gram for the fine fraction and about 5.0 to 6.0 square meters per gram for the coarse fraction. Shrinkage of gelled hydrated calcium silicate materials is increasingly retarded as the proportions of the given fine and coarse fractions progress through a range beginning with the ratio of, in parts by weight, approximately 4 parts of fine diatomaceous earth to approximately 3 parts of coarse diatomaceous earth and continuing up to 0 parts of fine diatomaceous earth to 1 part of coarse diatomaceous earth.

As stated above, the given surface area of the respective fine and coarse diatomaceous earth silica reactant fractions are determined with a Blaine air permeability fineness tester, Precision Scientific Company, Catalog No. 24360. The procedure of testing is as follows: The air permeability test cell is prepared by installing the cell base comprising a perforated supporting disc carrying a superimposed disc of #501 filter paper. A dry 0.76 gram sample of diatomaceous earth, dried to a constant weight at 250° F. is carefully added to the test cell while the cell is vibrated at the lowest amplitude setting given and the vibration is continued for a total of 60 seconds whereupon a second disc of #501 filter paper is positioned over the top of the diatomaceous earth in the sample cell and leveled with the plunger. The filled cell is then placed in the standard tapered glass joint on top of the Blaine instrument and the manometer fluid zeroed on the bottom cross hair whereupon the suction bulb is compressed and the stopcock opened slightly so that the manometer fluid rises slowly to the top cross hair. Then the stopcock is closed so that the fluid begins to drop in manometer sucking air through the cell and with a stop watch the time for the fluid to pass from the second to the third cross hair is recorded. The surface area of the sample is computed by means of the following formula.

Surface area in $$M.^2/g. = K \times \sqrt{\text{air flow time in sec.}}$$
$$K = 0.384$$

The following comprises specific illustrations or examples of applicable or typical means or conditions for the practice of this invention demonstrating the pronounced and progressive reduction in shrinkage resulting from the control and regulation of the surface area of the diatomaceous earth silica reactants and the ratios of the respective fine and coarse fractions of the diatomaceous earth silica reactant and, in turn, the utilization and advantages of this invention. It is to be appreciated, however, that the specific formulations and reactants, other than the diatomaceous earth silica, and/or the means or conditions employed in preparing or forming the products of the examples, or otherwise given hereinafter, are primarily exemplary and are not to be construed as limiting the invention to any particular component(s), or method(s) and condition(s) thereof given in the examples.

A series of low density abestos fiber reinforced, hydrated calcium silicate insulation type blocks of conventional and like compositions and physical properties, comparable to those of several commercial products available in the market, were prepared under identical conditions as set forth below and from identical reactants or compositions other than the given ratios of the surface areas of the diatomaceous earth silica reactants. In each case the solids or non-aqueous ingredients of the formulation consisted of:

|  | grams |
|---|---|
| Hydrated lime | 90 |
| Diatomaceous earth | 90 |
| Asbestos fiber (Grade 4D) | 20 |
| Total | 200 | and the proportions of fine and coarse diatomaceous earth fractions for each product of the series of examples, the only variable in each run, are given hereinafter in the table.

The manufacturing or forming procedue was in each instance as follows: 4000 milliliters of water were heated to 200° F. and the hydrated lime added thereto and mixed for one minute, followed by the addition of the fiber with 5 minutes mixing, and finally the diatomaceous earth was added and mixed 30 seconds. The resulting aqueous slurry or suspension of ingredients was permitted to gel quiescently for 30 minutes then gently agitated for 30 seconds, followed by a second quiescent gel period of 90 minutes and further gentle agitation for 30 seconds whereupon the resulting slurry of water containing gel was shaped in a precision type filter mold measuring 3 inches x 12 inches by partially dewatering and consolidating to a block of approximately 1¼ inch thickness. Upon shaping the resulting blocks are self-sustaining and handleable. The molded blocks were then autoclaved for 2 hours at 150 pounds per square inch gauge followed by a blow down at 1 pound per minute whereupon they were dried at approximately 300° F. in a steam coil heated dryer. Following drying the blocks were weighed hot, allowed to come to room conditions overnight, then all three dimensions were measured to one-thousandth of an inch and the length shrinkage computed as 12.000 inches minus the dry room condition length.

The ratios of the respective fine and coarse fractions of the diatomaceous earth silica reactants employed in the formation of each product of the series of examples and the corresponding reduction of shrinkage attributable thereto are given in the following table. The surface area of each fraction comprising the fine and coarse classifications of the diatomaceous earth silica, as determined by the Blaine surface area test apparatus and procedure set forth above, was as follows:

Fine fraction = 7.24 square meters per gram.
Coarse fraction = 5.51 square meters per gram.

| Example | Diatomaceous Earth Surface Area Ratio, Fine/Coarse | Percentage Reduction of Shrinkage |
|---|---|---|
| Standard | 2/1 | 0 |
| I | 4/3 | 2.9 |
| II | 1/1 | 5.1 |
| III | 1/2 | 10.1 |
| IV | 0/1 | 20.2 |

As set forth in U.S. Letters Patent No. 2,699,097, components or ingredients suitable for the practice of this invention may comprise asbestos fiber in amounts up to about 40% by weight and both the hydrated lime and diatomaceous earth silica reactants can be present in amounts between about 30 to 60% by weight. For typical products of this type, the ingredients preferably comprise about 10% fiber with about equal parts of hydrated lime and diatomaceous earth silica. Additionally products of this invention, in accordance with the knowledge of the art, may incorporate small amounts of hydraulic setting cements such as portland cement and/or clays such as bentonite in amounts ranging up to approximately 15% by weight of the solid contents.

The improved method of this invention of manufacturing gelled and shaped or molded hydrated calcium silicate products is applicable to substantially all hydrated calcium silicate manufacturing processes or techniques and products comprising the gelling or pre-reacting of the lime and silica reactants, including for example the procedures of U.S. Letters Patent No. 1,520,893, No. 1,932,971 and No. 2,699,097 and particularly to those procedures comprising precision molding or shaping of the article or insulating product prior to autoclaving or curing. Moreover this improved method specifically applies to the materials, means and conditions of U.S. Letters Patent No. 2,699,097 and the disclosure of said patent is specifically incorporated in the subject specification.

It will be understood that the foregoing details are given for purposes of illustration and not restriction, and that variations within the spirit of this invention are to be included within the scope of the appended claims.

We claim:

1. An improved method of manufacturing gelled and molded, low density hydrated calcium silicate heat insulating bodies with reduced shrinkage, said method comprising the steps of:
   (a) forming an expanded water-containing hydrated calcium silicate gel reaction product by maintaining a dilute aqueous slurry containing lime and diatomaceous earth silica at temperatures of approximately 120 to 210° F. for periods of approximately ½ to 3 hours;
   (b) consolidating and shaping the water-containing expanded hydrated calcium silicate gel reaction product by molding the dilute aqueous slurry forming a low solids density body of expanded hydrated calcium silicate gel and entrained water of substantially final dimensions;
   (c) steam indurating the consolidated and shaped water-containing body further reacting the lime and diatomaceous earth silica reactants and thereby producing a porous, durable hydrated calcium silicate bonded matrix; and
   (d) the improvement of reducing the shrinkage of the molded hydrated calcium silicate body comprising, in combination with the foregoing steps, providing the diatomaceous earth silica reactant in a ratio of fine diatomaceous earth having a surface area averaging about 6.5 to 10.0 square meters per gram and coarse diatomaceous earth having a surface area averaging about 4.5 to 6.0 square meters per gram in proportions of from approximately 4 parts by weight of the said fine diatomaceous earth to approximately 3 parts by weight of the said coarse diatomaceous earth ranging up to 0 parts by weight of the said fine diatomaceous earth to 1 part by weight of the said coarse diatomaceous earth.

2. The method of claim 1 wherein the aqueous slurry and in turn the consolidated and shaped body comprises asbestos.

3. An improved method of manufacturing gelled and molded, low density hydrated calcium silicate heat insulating bodies with reduced shrinkage, said method comprising the steps of:
   (a) forming an expanded water-containing hydrated calcium silicate gel reaction product by maintaining a dilute aqueous slurry containing lime and diatomaceous earth silica at temperatures of approximately 120 to 210° F. for periods of approximately ½ to 3 hours;
   (b) consolidating and shaping the water-containing expanded hydrated calcium silicate gel reaction product by molding the dilute aqueous slurry forming a low solids density body of expanded hydrated calcium silicate gel and entraining water of substantially final dimensions;
   (c) steam indurating the consolidated and shaped, water-containing body further reacting the lime and diatomaceous earth silica reactants and thereby producing a porous, durable hydrated calcium silicate bonded matrix; and
   (d) the improvement of reducing the shrinkage of the molded low density calcium silicate body comprising, in combination with the foregoing steps, providing the diatomaceous earth silica reactant in a ratio of fine diatomaceous earth having a surface area averaging about 7.0 to 8.0 square meters per gram and coarse diatomaceous earth having a surface area averaging about 5.0 to 6.0 square meters per gram in proportions of from approximately 4 parts by weight of the said fine diatomaceous earth to approximately 3 parts by weight of the said coarse diatomaceous earth ranging up to 0 parts by weight of the said fine diatomaceous earth to 1 part by weight of the said coarse diatomaceous earth.

4. The method of claim 3 wherein the aqueous slurry and in turn the consolidated and shaped body comprises asbestos.

5. An improved method of manufacturing filter press precision molded, low density hydrated calcium silicate heat insulating bodies with reduced shrinkage, said method comprising the steps of:
   (a) forming an expanded water-containing hydrated calcium silicate gel reaction product by maintaining a dilute aqueous slurry containing lime and diatomaceous earth silica at temperatures of approximately 170 to 210° F. for periods from approximately ½ to 3 hours;
   (b) consolidating and shaping the water-containing expanded calcium silicate gel reaction product by filter molding the dilute aqueous slurry forming a low solids density body of expanded hydrated calcium silicate gel and entrained water of substantially final dimensions;
   (c) steam indurating the consolidated and shaped water-containing body further reacting the lime and diatomaceous earth silica reactants and thereby producing a porous, durable hydrated calcium silicate bonded matrix having a solids density of approximately 8 to 30 pounds per cubic foot;
   (d) then drying the steam cured hydrated calcium silicate body; and
   (e) the improvement of reducing the shrinkage of the precision molded hydrated calcium silicate body comprising, in combination with the foregoing steps, providing the diatomaceous earth silica reactant in a ratio of fine diatomaceous earth having a surface area averaging about 7.24 square meters per gram and a coarse diatomaceous earth having a surface area averaging about 5.5 square meters per gram in proportions of from approximately 4 parts by weight of the said fine diatomaceous earth to approximately 3 parts by weight of the said coarse diatomaceous earth ranging up to approximately 1 part by weight of the fine said diatomaceous earth to approximately 2 parts by weight of the said coarse diatomaceous earth.

6. The method of claim 5 wherein the aqueous slurry and in turn the consolidated and shaped body comprises asbestos as a fibrous reinforcement.

7. The hydrated calcium silicate product of the method of claim 1.

References Cited

UNITED STATES PATENTS 2,699,097   1/1955   Binkley _____ 162—153

DONALL H. SYLVESTER, Primary Examiner.

R. BAJEFSKY, Assistant Examiner.